US012615195B2

(12) United States Patent
Gad et al.

(10) Patent No.: US 12,615,195 B2
(45) Date of Patent: Apr. 28, 2026

(54) DYNAMIC NODE KEY PERFORMANCE INDICATOR REPORTING IN OPEN RADIO ACCESS NETWORK

(71) Applicant: Dell Products L.P., Round Rock, TX (US)

(72) Inventors: Omar Gad, London (GB); Marwan Mansour, Alexandria (EG); Mohamed Abouzeid, Sheikh Zayed City (EG)

(73) Assignee: DELL PRODUCTS, L.P., Round Rock, TX (US)

( * ) Notice: Subject to any disclaimer, the term of this patent is extended or adjusted under 35 U.S.C. 154(b) by 331 days.

(21) Appl. No.: 18/337,149

(22) Filed: Jun. 19, 2023

(65) Prior Publication Data

US 2024/0422077 A1    Dec. 19, 2024

(51) Int. Cl.
H04L 41/5009      (2022.01)
H04L 41/16      (2022.01)

(52) U.S. Cl.
CPC .......... H04L 41/5009 (2013.01); H04L 41/16 (2013.01)

(58) Field of Classification Search
CPC .................................................. H04L 41/5009
See application file for complete search history.

(56) References Cited

U.S. PATENT DOCUMENTS

| | | | | |
|---|---|---|---|---|
| 2002/0174217 A1* | 11/2002 | Anderson | ............. | H04L 41/147 709/224 |
| 2023/0209370 A1* | 6/2023 | Pateromichelakis | .. | G06N 20/00 370/328 |
| 2023/0246724 A1* | 8/2023 | Pateromichelakis | .. | H04J 11/005 370/329 |

FOREIGN PATENT DOCUMENTS

| | | | |
|---|---|---|---|
| WO | 2022/046756 A1 | 3/2022 | |
| WO | 2023/023034 A1 | 2/2023 | |
| WO | WO-2023017102 A1 * | 2/2023 | ............. G06N 3/088 |
| WO | 2023/034500 A1 | 3/2023 | |
| WO | 2023/042141 A1 | 3/2023 | |
| WO | 2023/091664 A1 | 5/2023 | |

(Continued)

OTHER PUBLICATIONS

International Search Report and Written Opinion received for PCT Application Serial No. PCT/US2023/036196 dated Mar. 4, 2024, 17 pages.

(Continued)

*Primary Examiner* — Abdeltif Ajid
(74) *Attorney, Agent, or Firm* — Amin, Turocy & Watson, LLP

(57)      ABSTRACT

Dynamic node key performance indicator reporting in an open radio access network (e.g., using a computerized tool), is enabled. For example, a system can comprise a processor and a memory that stores executable instructions that, when executed by the processor, facilitate performance of operations, comprising determining resource utilization of a network node, determining a requested reporting period of a key performance indicator, applicable to the network node, requested by an extended application of a radio access network intelligent controller, and using a reporting model generated using machine learning based on past resource utilization, other than the resource utilization, and past reporting periods, other than the requested reporting period, generating a reporting period recommendation applicable to the network node and the extended application.

20 Claims, 11 Drawing Sheets

(56)     References Cited

FOREIGN PATENT DOCUMENTS

WO      WO-2023150734 A1 *   8/2023   ........... G06F 9/5027

OTHER PUBLICATIONS

Polese et al., "Understanding O-RAN: Architecture, Interfaces, Algorithms, Security, and Research Challenges", IEEE Communications Surveys & Tutorials, 25, No. 2, 2023, pp. 1376-1411.

International Preliminary Report on Patentability received for PCT Application Serial No. PCT/US2023/036196 dated Jan. 2, 2026, 10 pages.

* cited by examiner

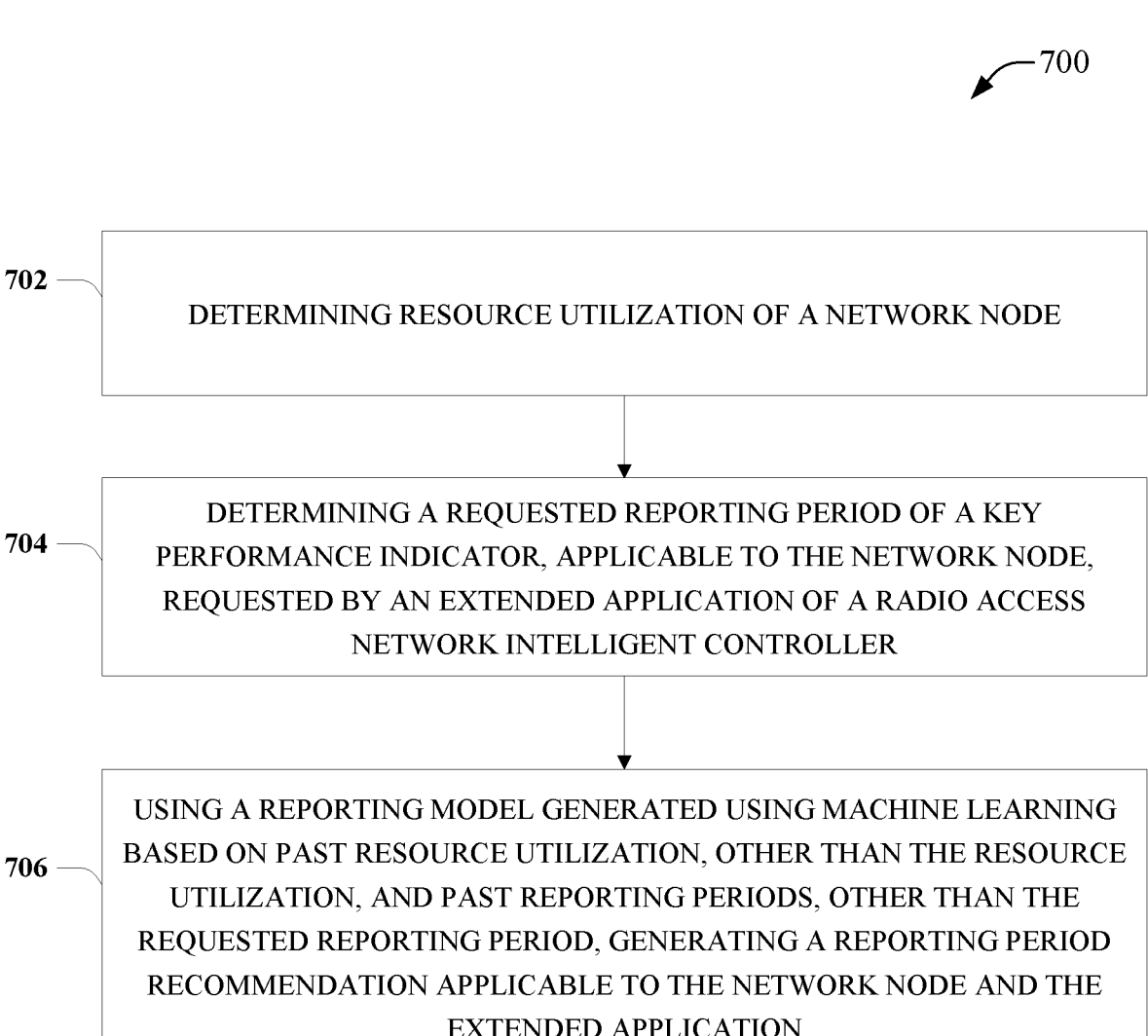

700

702 — DETERMINING RESOURCE UTILIZATION OF A NETWORK NODE

704 — DETERMINING A REQUESTED REPORTING PERIOD OF A KEY PERFORMANCE INDICATOR, APPLICABLE TO THE NETWORK NODE, REQUESTED BY AN EXTENDED APPLICATION OF A RADIO ACCESS NETWORK INTELLIGENT CONTROLLER

706 — USING A REPORTING MODEL GENERATED USING MACHINE LEARNING BASED ON PAST RESOURCE UTILIZATION, OTHER THAN THE RESOURCE UTILIZATION, AND PAST REPORTING PERIODS, OTHER THAN THE REQUESTED REPORTING PERIOD, GENERATING A REPORTING PERIOD RECOMMENDATION APPLICABLE TO THE NETWORK NODE AND THE EXTENDED APPLICATION

FIG. 7

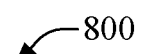

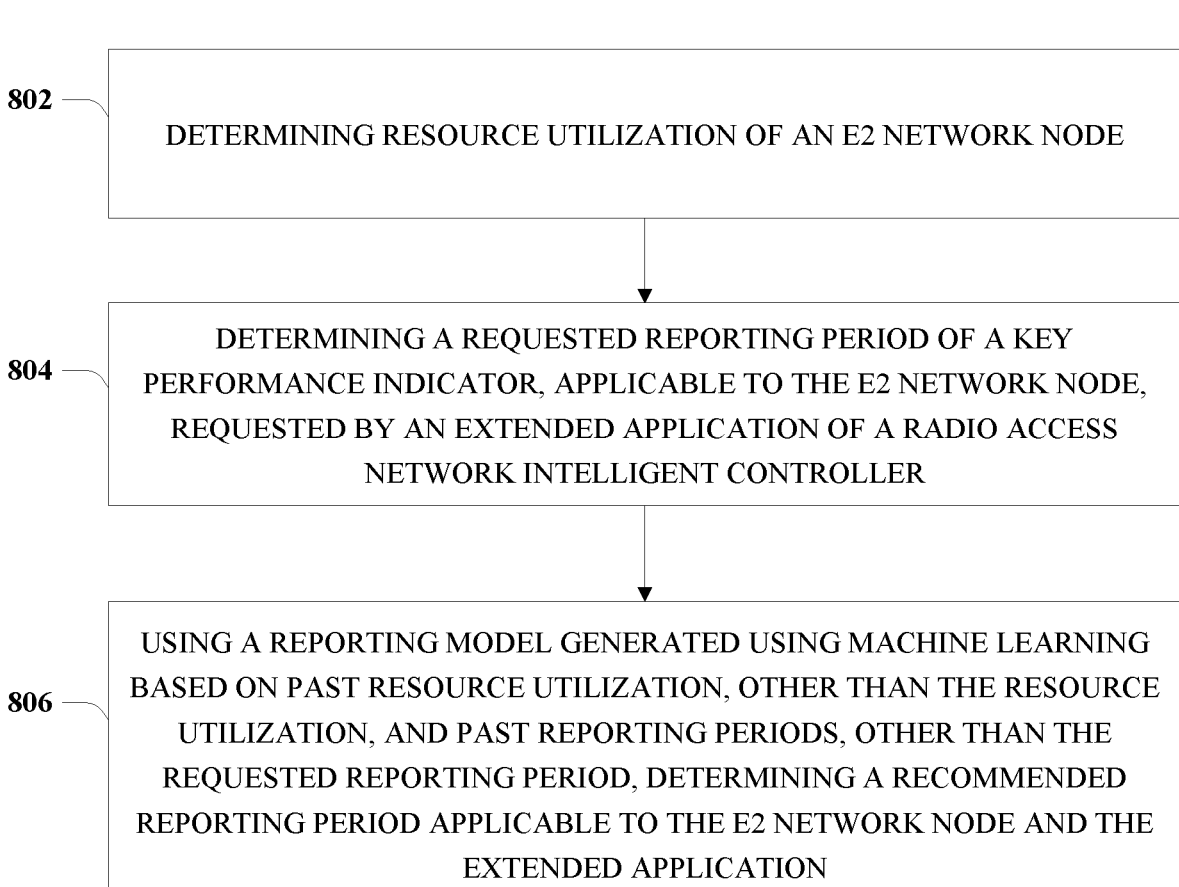

802 — DETERMINING RESOURCE UTILIZATION OF AN E2 NETWORK NODE

804 — DETERMINING A REQUESTED REPORTING PERIOD OF A KEY PERFORMANCE INDICATOR, APPLICABLE TO THE E2 NETWORK NODE, REQUESTED BY AN EXTENDED APPLICATION OF A RADIO ACCESS NETWORK INTELLIGENT CONTROLLER

806 — USING A REPORTING MODEL GENERATED USING MACHINE LEARNING BASED ON PAST RESOURCE UTILIZATION, OTHER THAN THE RESOURCE UTILIZATION, AND PAST REPORTING PERIODS, OTHER THAN THE REQUESTED REPORTING PERIOD, DETERMINING A RECOMMENDED REPORTING PERIOD APPLICABLE TO THE E2 NETWORK NODE AND THE EXTENDED APPLICATION

FIG. 8

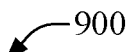
900

902 — DETERMINING, BY A RADIO ACCESS NETWORK INTELLIGENT CONTROLLER COMPRISING A PROCESSOR, RESOURCE UTILIZATION OF A NETWORK NODE

904 — DETERMINING, BY THE RADIO ACCESS NETWORK INTELLIGENT CONTROLLER, A REQUESTED REPORTING PERIOD OF A KEY PERFORMANCE INDICATOR, APPLICABLE TO THE NETWORK NODE, REQUESTED BY EXTENDED APPLICATION ASSOCIATED WITH THE RADIO ACCESS NETWORK INTELLIGENT CONTROLLER

906 — USING A REPORTING MACHINE LEARNING MODEL GENERATED USING ARTIFICIAL INTELLIGENCE BASED ON PAST RESOURCE UTILIZATION, OTHER THAN THE RESOURCE UTILIZATION, AND PAST REPORTING PERIODS, OTHER THAN THE REQUESTED REPORTING PERIOD, GENERATING, BY THE RADIO ACCESS NETWORK INTELLIGENT CONTROLLER, RECOMMENDATION DATA REPRESENTATIVE OF A REPORTING PERIOD RECOMMENDATION APPLICABLE TO THE NETWORK NODE AND THE EXTENDED APPLICATION

FIG. 9

DYNAMIC NODE KEY PERFORMANCE INDICATOR REPORTING IN OPEN RADIO ACCESS NETWORK

BACKGROUND

Currently, E2 nodes do not identify how frequently the E2 nodes can report data to a controller, which causes potential subscription rejections and leads to time wasted reconfiguring extended applications (xApps). E2 nodes are prone to periods of fluctuating network traffic, which can impact their respective abilities to frequently report certain data. xApps also are not aware of these limitations of the E2 nodes, and are thus unable to accommodate the network traffic fluctuations that may occur. Manual adjustments can be cumbersome, taking multiple trial and errors, made especially difficult by fluctuating network traffic conditions. Even if an E2 node was forced to accept the subscriptions, doing so would negatively impact the E2 node's performance with respect to user equipment (UE) traffic.

The above-described background relating to telecommunications systems is merely intended to provide a contextual overview of some current issues and is not intended to be exhaustive. Other contextual information may become further apparent upon review of the following detailed description.

BRIEF DESCRIPTION OF DRAWINGS

FIG. 7 is a block flow diagram for a process associated with dynamic node key performance indicator reporting in an open radio access network, in accordance with one or more embodiments described herein.

FIG. 8 is a block flow diagram for a process associated with dynamic node key performance indicator reporting in an open radio access network, in accordance with one or more embodiments described herein.

FIG. 9 is a block flow diagram for a process associated with dynamic node key performance indicator reporting in an open radio access network, in accordance with one or more embodiments described herein.

DETAILED DESCRIPTION

Figure 1:
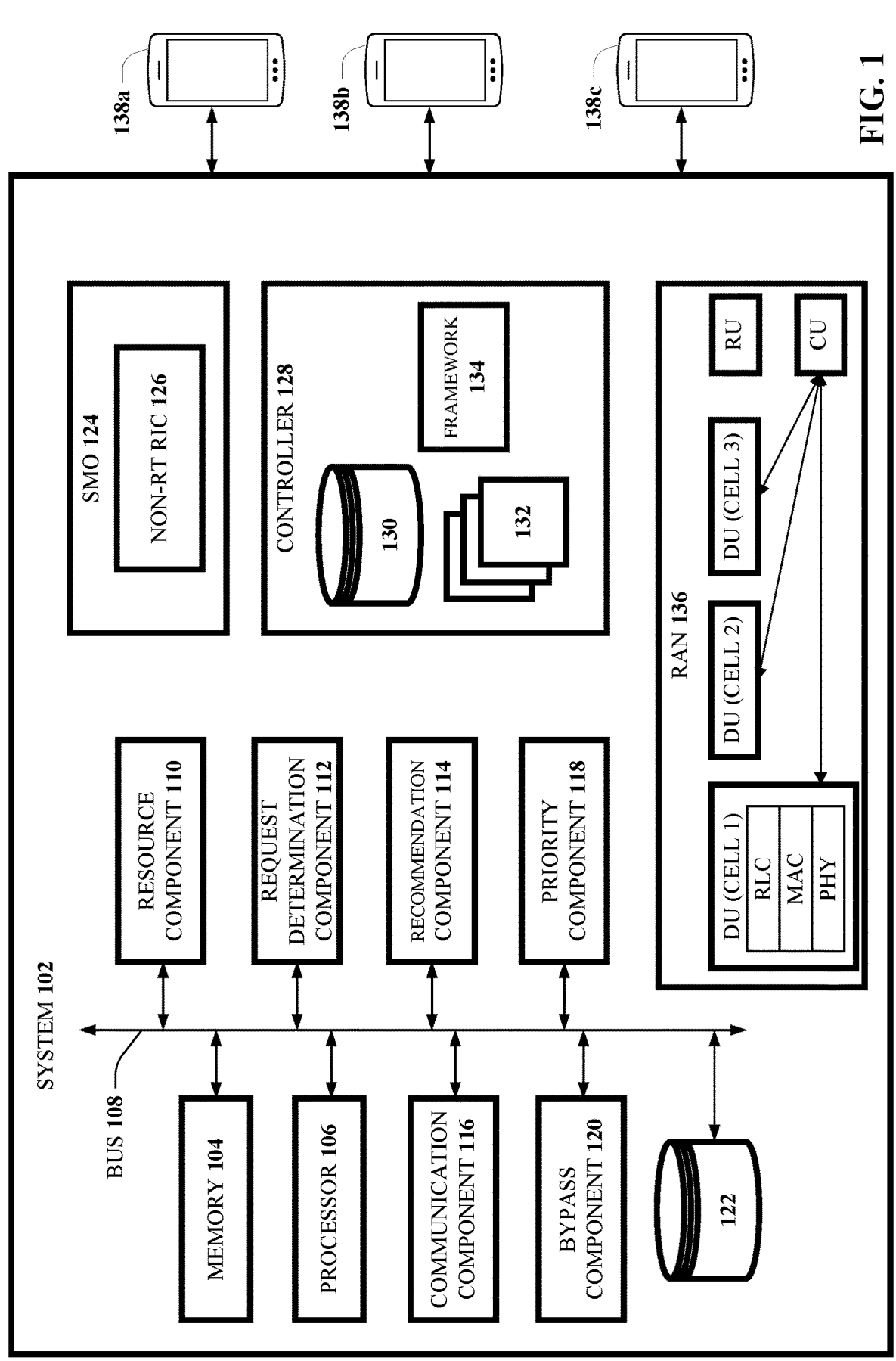
FIG. 1 is a block diagram of an exemplary system in accordance with one or more embodiments described herein.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

As alluded to above, data reporting in an open radio access network (ORAN) can be improved in various ways, and various embodiments are described herein to this end and/or other ends. The disclosed subject matter relates to telecommunications systems and, more particularly, to dynamic node key performance indicator reporting in an ORAN.

According to an embodiment, a system can comprise a processor, and a memory that stores executable instructions that, when executed by the processor, facilitate performance of operations, comprising determining resource utilization of a network node, determining a requested reporting period of a key performance indicator, applicable to the network node, requested by an extended application of a radio access network intelligent controller, and using a reporting model generated using machine learning based on past resource utilization, other than the resource utilization, and past reporting periods, other than the requested reporting period, generating a reporting period recommendation applicable to the network node and the extended application.

In one or more embodiments, the reporting period recommendation can comprise a recommended reporting period and/or a minimum reporting period. In one or more embodiments, the network node can comprise an E2 node.

In one or more embodiments, the operations can further comprise receiving a subscription request from the extended application, wherein the reporting period recommendation is generated in response to receiving the subscription request. In this regard, the operations can further comprise determining a priority level, according to a defined priority criterion, applicable to the subscription request, wherein the reporting period recommendation is further generated based on the priority level applicable to the subscription request. Further in this regard, the operations can further comprise, in response to a determination that the subscription request comprises a threshold high priority level, according to the defined priority criterion, bypassing the reporting period recommendation.

In one or more embodiments, the extended application can be among a group of extended applications subscribed on the network node. In one or more embodiments, the reporting period recommendation can be determined to maintain a threshold level of network performance, applicable to the network node, according to a defined network performance criterion.

In one or more embodiments, the key performance indicator can comprise a signal to interference and noise ratio applicable to the network node, or a block error rate applicable to the network node. In one or more embodiments, the extended application can comprise a network optimization extended application. In one or more embodiments, the reporting period recommendation can comprise a reporting frequency applicable to the extended application.

In another embodiment, a non-transitory machine-readable medium can comprise executable instructions that, when executed by a processor, facilitate performance of operations, comprising determining resource utilization of an E2 network node, determining a requested reporting period of a key performance indicator, applicable to the E2 network node, requested by an extended application of a radio access network intelligent controller, and using a reporting model generated using machine learning based on past resource utilization, other than the resource utilization, and past reporting periods, other than the requested reporting period, determining a recommended reporting period applicable to the E2 network node and the extended application.

In one or more embodiments, the recommended reporting period can comprise a minimum reporting period. In one or more embodiments, the operations can further comprise receiving a subscription request from the extended application, wherein the recommended reporting period is generated in response to receiving the subscription request.

In one or more embodiments, the operations can further comprise determining a priority level, according to a defined priority criterion, applicable to the subscription request, wherein the recommended reporting period is further generated based on the priority level applicable to the subscription request. In this regard, the operations can further comprise, in response to a determination that the subscription request comprises a high priority level, according to the defined priority criterion, bypassing the recommended reporting period.

According to yet another embodiment, a method can comprise, determining, by a radio access network intelligent controller comprising a processor, resource utilization of a network node, determining, by the radio access network intelligent controller, a requested reporting period of a key performance indicator, applicable to the network node, requested by extended application associated with the radio access network intelligent controller, and using a reporting machine learning model generated using artificial intelligence based on past resource utilization, other than the resource utilization, and past reporting periods, other than the requested reporting period, generating, by the radio access network intelligent controller, recommendation data representative of a reporting period recommendation applicable to the network node and the extended application.

In one or more embodiments, the reporting period recommendation can be determined to maintain a threshold level of network performance, applicable to the network node, according to a defined network performance criterion. In one or more embodiments, the key performance indicator can comprise ratio data representative of a signal to interference and noise ratio applicable to the network node, or block error rate data representative of a block error rate applicable to the network node. In one or more embodiments, the recommendation data can comprise reporting frequency data representative of a reporting frequency applicable to the extended application.

It should be appreciated that additional manifestations, configurations, implementations, protocols, etc. can be utilized in connection with the following components described herein or different/additional components as would be appreciated by one skilled in the art.

Embodiments herein can comprise a machine learning (ML)-based rApp to predict minimum and recommended periodicity for subscribing to E2 Node parameters. Extended subscription messages can be utilized with xApp priority, for instance, when sending to E2 Nodes. Embodiments herein can comprise an application programming interface (API) to near real-time (RT) radio access network intelligent controller (RIC) to manage xApp subscriptions.

Embodiments herein can dynamically update recommended and/or minimum reporting periodicity, for instance, according to load, utilization, etc. In this regard, embodiments herein can enable periodic and/or event-triggered policy updates using ML based recommendations. An extended xApp framework can be utilized to manage subscription recommendations with xApps. Optimized quality of service (QOS) is enabled, for instance, by recommending appropriate periodicity for a given use-case. Further, optimized energy efficiency is enabled, for instance, by recommending appropriate periodicity for resource utilization.

Various embodiments herein optimize the process of xApps subscriptions, taking into consideration the time, energy, and/or QoS applicable to the xApps, as well as E2 Node resource utilization. Embodiments herein enable deployment of an ML model as an rApp in a non-RT RIC, for instance, to predict the minimum and recommended reporting period for an xApp to subscribe to E2 node parameters. This ML model can utilize the current status of the E2 node that a specific xApp is subscribing to as an input parameter, and then be leveraged to predict the minimum reporting period that this E2 node will be able to provide (e.g., without affecting the Quality of the service of the xApp). This ML model can also be utilized to update the periodicity of an already subscribed xApp, for instance, to be able to efficiently support more xApps. These updates can be automatically scheduled or event triggered, for instance, based on defined network requirements. It is noted that such updates can be performed according to utilization, the load (s) of the E2 node, and/or the quantity of xApps subscribed to the E2 node. The xApp can rely on one or more of a plurality of approaches to achieve its task, and can switch between these approaches, for instance, based on the available reporting period determined using the ML model. For example, the xApp can rely on a first approach if the ML model and/or a component or element herein predicts that the E2 node can support the requested reporting period to send its parameters. However, if the ML model and/or a component or element herein recommends a higher reporting period, then the xApp can adapt, for instance, by following a second approach in which it is able to function by relying on less-frequent reporting period, even if this will result in less reliable performance of the xApp. The foregoing can balance the availability of the E2 node at the cost of the performance of the xApp.

Embodiments herein can accommodate respective defined priorities of xApps. This enables xApps of higher priority to bypass model predictions, and enables the E2 node to follow the requested reporting period by the xApp. Accordingly, the ML model can update the recommended reporting period of lower priority xApps, for instance, to accommodate for the additional resources allocated for the high priority xApp. This can lead to lower priority xApps switching to alternative approaches that utilize longer reporting periods.

In various embodiments, the ML model (e.g., which can be utilized to predict the minimum reporting period for an E2 node) can be trained by using data reflecting the usage parameters of the E2 node, such as the CPU utilization, memory, and/or the heating levels of the E2 node. Additionally, or alternatively, the ML model can rely on data corresponding to xApp requirements and/or the historical subscription details (e.g., corresponding to current requirements of the xApp and/or the historical status of previous subscriptions, including altered, failed, and/or accepted requests). It is noted that the ML model can be utilized to optimize QoS, for instance, by recommending appropriate reporting periods for a given use case, resulting in more reliable reports coming from the E2 nodes, which can result in optimization of the quality of service of the xApp and less waiting time. Moreover, the ML model can be utilized to optimize energy efficiency, for instance, by recommending appropriate reporting period, resulting in more efficient resources utilization and less wasted power.

Turning now to FIG. 1, there is illustrated an example, non-limiting system 102 in accordance with one or more embodiments herein. System 102 can comprise a computerized tool, which can be configured to perform various operations relating to dynamic E2 node KPI reporting in an ORAN. The system 102 can comprise one or more of a variety of components, such as memory 104, processor 106, bus 108, resource component 110, request determination component 112, recommendation component 114, communication component 116, priority component 118, bypass component 120, model(s) 122, service management and orchestration (SMO) 124, non-RT RIC 126, controller 128 (e.g., a near-RT RIC), database 130, xApp(s) 132, xApp framework 134, and/or radio access network (RAN) 136 (e.g., an E2 node). In various embodiments, the system 102 can be communicatively coupled to, or can further comprise, one or more user equipment (UE) 138. In various embodiments, one or more of the memory 104, processor 106, bus 108, resource component 110, request determination component 112, recommendation component 114, communication component 116, priority component 118, bypass component 120, model(s) 122, SMO 124, non-RT RIC 126, controller 128, database 130, xApp(s) 132, xApp framework 134, RAN 136, and/or UE 138 can be communicatively or operably coupled (e.g., over a bus or wireless network) to one another to perform one or more functions of the system 102.

In various embodiments, the SMO 124 can comprise a management and orchestration layer that controls configuration and automation aspects of RIC and/or RAN elements. In this regard, the SMO 124 can onboard xApps and/or rApps onto RIC components. In various embodiments, the controller 128 can comprise a near-RT RIC.

In various embodiments, the controller 128 (e.g., a near-RT RIC) can comprise a database 130, one or more xApps 132, and/or an xApp framework 134. The database 130 can store KPIs collected (e.g., via the resource component 110) from E2 nodes (e.g., RAN 136) and/or store subscription details (e.g., requested KPIs, accepted/failed requests). In various embodiments, an xApp 132 can subscribe on E2 node KPIs. The xApp framework 134 can comprise an API for xApps (e.g., xApp 132) to subscribe on new registered E2 nodes (e.g., RAN 136) and/or enable configuration updates applicable to the E2 nodes (e.g., RAN 136) and or the xApps (e.g., xApp 132).

According to an embodiment, the resource component 110 can determine resource utilization of a network node (e.g., RAN 136). In one or more embodiments, the network node (e.g., RAN 136) can comprise an E2 node. In this regard, resource component 110 can store KPIs collected from E2 nodes (e.g., RAN 136) and/or store subscription details (e.g., requested KPIs, accepted/failed requests) in the database 130.

According to an embodiment, the request determination component 112 can determine a requested reporting period of a KPI (e.g., applicable to the RAN 136), requested by an xApp 132 of a near-RT RIC (e.g., controller 128). In one or more embodiments, the xApp 132 can comprise a network optimization xApp 132. In various embodiments, the xApp 132 can be among a group of xApps (e.g., xApps 132) subscribed on the RAN 136 (e.g., an E2 node). In one or more embodiments, the KPI can comprise a signal to interference and noise ratio (SINR) applicable to the network node (e.g., RAN 136), or a block error rate (BER) applicable to the network node (e.g., RAN 136).

According to an embodiment, the recommendation component 114 can, using a reporting model (e.g., ML model 204) (e.g., of the model(s) 122) generated (e.g., via the recommendation component 114) using machine learning based on past resource utilization, other than the instant resource utilization, and past reporting periods, other than the instant requested reporting period, generate a reporting period recommendation applicable to the RAN 136 and/or the xApp 132. In various embodiments, the reporting period recommendation can comprise a recommended reporting period and/or a minimum reporting period. In one or more the reporting period recommendation can be determined (e.g., via the recommendation component 114) to maintain a defined threshold level of network performance, applicable to the network node (e.g., RAN 136), according to a defined network performance criterion. Such a defined network performance criterion can comprise one or more of such as packet drop, overheating of a component of the system 102, near maximum utilization of CPU and/or RAM of the RAN 136 or another component of the system 102, bandwidth, throughput, latency, jitter, or another suitable network performance criterion. In some embodiments, the reporting period recommendation can comprise a reporting frequency applicable to the xApp 132. In various embodiments described herein, the recommendation component 114 can generate a reporting period recommendation, for instance, by analyzing CPU utilization and Radio Access Memory (RAM) data from E2 nodes (e.g., RAN 136), analyzing xApp 132 requirements (e.g., requested reporting periods) and historical subscription request details from the near-RT RIC (e.g., controller 128), and/or updating configuration on E2 Node (e.g., RAN 136) as an O1 message.

According to an embodiment, the communication component 116 can receive a subscription request from the xApp 132. In this regard, the reporting period recommendation can be generated (e.g., by the recommendation component 114) in response to receiving the subscription request from the xApp 132. It is noted that the communication component 116 can comprise the hardware required to implement a variety of communication protocols (e.g., infrared ("IR"), shortwave transmission, near-field communication ("NFC"), Bluetooth, Wi-Fi, long-term evolution ("LTE"), 3G, 4G, 5G, 6G, global system for mobile communications ("GSM"), code-division multiple access ("CDMA"), satellite, visual cues, radio waves, etc.)

According to an embodiment, the priority component 118 can determine a priority level, according to a defined priority criterion, applicable to the subscription request from the xApp 132. In this regard, the reporting period recommendation can be further generated (e.g., via the recommendation component 114) based on the priority level applicable to the subscription request. In various embodiments, such a priority ID/level can be comprised in configuration data applicable to a corresponding xApp 132. It is noted that priorities herein can comprise one or more of normal priority, high priority, low priority, or other suitable defined priority levels or IDs. According to an embodiment, the bypass component 120 can, in response to a determination (e.g., via the priority component 118) that the subscription request (e.g., from the xApp 132) comprises a threshold high priority level, and according to the defined priority criterion, bypass the reporting period recommendation. In this regard, a corresponding E2 node (e.g., RAN 136) can accept the xApp 132 subscription regardless of whether E2 node performance would be negatively impacted.

Various embodiments herein can employ artificial-intelligence or machine learning systems and techniques to facilitate learning user behavior, context-based scenarios, preferences, etc. in order to facilitate taking automated action with high degrees of confidence. Utility-based analysis can be utilized to factor benefit of taking an action against cost of taking an incorrect action. Probabilistic or statistical-based analyses can be employed in connection with the foregoing and/or the following.

It is noted that systems and/or associated controllers, servers, or machine learning components herein can comprise artificial intelligence component(s) which can employ an artificial intelligence (A.I.) model and/or M.L. or an M.L. model that can learn to perform the above or below described functions (e.g., via training using historical training data and/or feedback data).

In some embodiments, recommendation component 114 can comprise an A.I. and/or M.L. model that can be trained (e.g., via supervised and/or unsupervised techniques) to perform the above or below-described functions using historical training data comprising various context conditions that correspond to various augmented network optimization operations. In this example, such an A.I. and/or M.L. model can further learn (e.g., via supervised and/or unsupervised techniques) to perform the above or below-described functions using training data comprising feedback data, where such feedback data can be collected and/or stored (e.g., in memory) by the Recommendation component 114. In this example, such feedback data can comprise the various instructions described above/below that can be input, for instance, to a system herein, over time in response to observed/stored context-based information.

A.I./M.L. components herein can initiate an operation(s) associated with a based on a defined level of confidence determined using information (e.g., feedback data). For example, based on learning to perform such functions described above using feedback data, performance information, and/or past performance information herein, a recommendation component 114 herein can initiate an operation associated with determining various thresholds herein (e.g., a motion pattern thresholds, input pattern thresholds, similarity thresholds, authentication signal thresholds, audio frequency thresholds, or other suitable thresholds).

In an embodiment, the recommendation component 114 can perform a utility-based analysis that factors cost of initiating the above-described operations versus benefit. In this embodiment, the recommendation component 114 can use one or more additional context conditions to determine various thresholds herein.

To facilitate the above-described functions, a recommendation component 114 herein can perform classifications, correlations, inferences, and/or expressions associated with principles of artificial intelligence. For instance, the recommendation component 114 can employ an automatic classification system and/or an automatic classification. In one example, the recommendation component 114 can employ a probabilistic and/or statistical-based analysis (e.g., factoring into the analysis utilities and costs) to learn and/or generate inferences. The recommendation component 114 can employ any suitable machine-learning based techniques, statistical-based techniques and/or probabilistic-based techniques. For example, the recommendation component 114 can employ expert systems, fuzzy logic, support vector machines (SVMs), Hidden Markov Models (HMMs), greedy search algorithms, rule-based systems, Bayesian models (e.g., Bayesian networks), neural networks, other non-linear training techniques, data fusion, utility-based analytical systems, systems employing Bayesian models, and/or the like. In another example, the recommendation component 114 can perform a set of machine-learning computations. For instance, the recommendation component 114 can perform a set of clustering machine learning computations, a set of logistic regression machine learning computations, a set of decision tree machine learning computations, a set of random forest machine learning computations, a set of regression tree machine learning computations, a set of least square machine learning computations, a set of instance-based machine learning computations, a set of regression machine learning computations, a set of support vector regression machine learning computations, a set of k-means machine learning computations, a set of spectral clustering machine learning computations, a set of rule learning machine learning computations, a set of Bayesian machine learning computations, a set of deep Boltzmann machine computations, a set of deep belief network computations, and/or a set of different machine learning computations.

Figure 2:
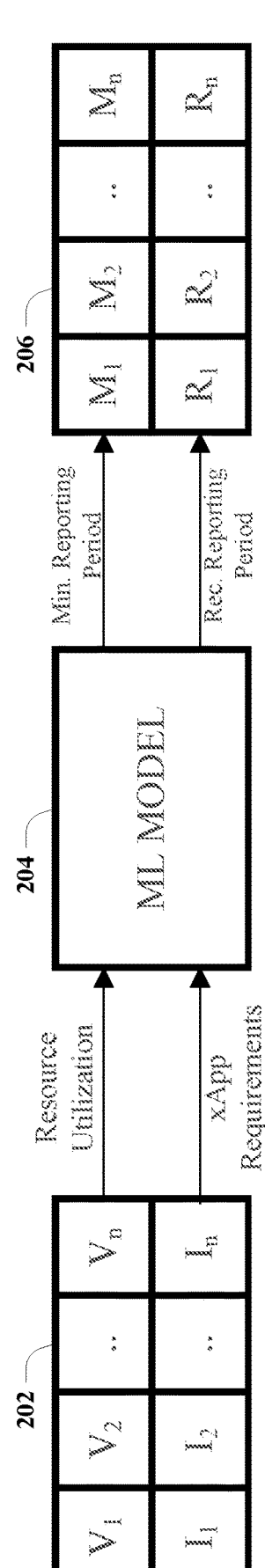
FIG. 2 is a diagram of exemplary reporting period recommendation generation in accordance with one or more embodiments described herein.

Turning now to FIG. 2, there is illustrated a diagram 200 of exemplary reporting period recommendation generation (e.g., via the recommendation component 114) in accordance with one or more embodiments described herein. In various embodiments, the recommendation component 114 can predict minimum supported reporting period (e.g., in output 206) and/or recommended reporting periods (e.g., in output 206), for instance, for registered E2 nodes (e.g., RAN 136). Input 202 to the ML model 204 can comprise, for instance, resource utilization data (e.g., applicable to the RAN 136) and/or xApp 132 requirement data. The minimum reporting period can indicate the highest granularity at which an E2 node (e.g., RAN 136) can report data. The recommended reporting period can indicate the most energy efficient granularity for the respective E2 node. In one or more embodiments, the recommendation component 114 can trigger, for instance, O1 messages from the SMO 124 to configure E2 nodes (e.g., RAN 136) with an updated reporting period recommendation (e.g., utilizing resource utilization data and/or xApp requirements data) (e.g., via the recommendation component 114). Such recommendations can be generated (e.g., via the recommendation component 114) periodically, for instance, to update the E2 Node (e.g., RAN 136) recommended periods.

Figure 3:
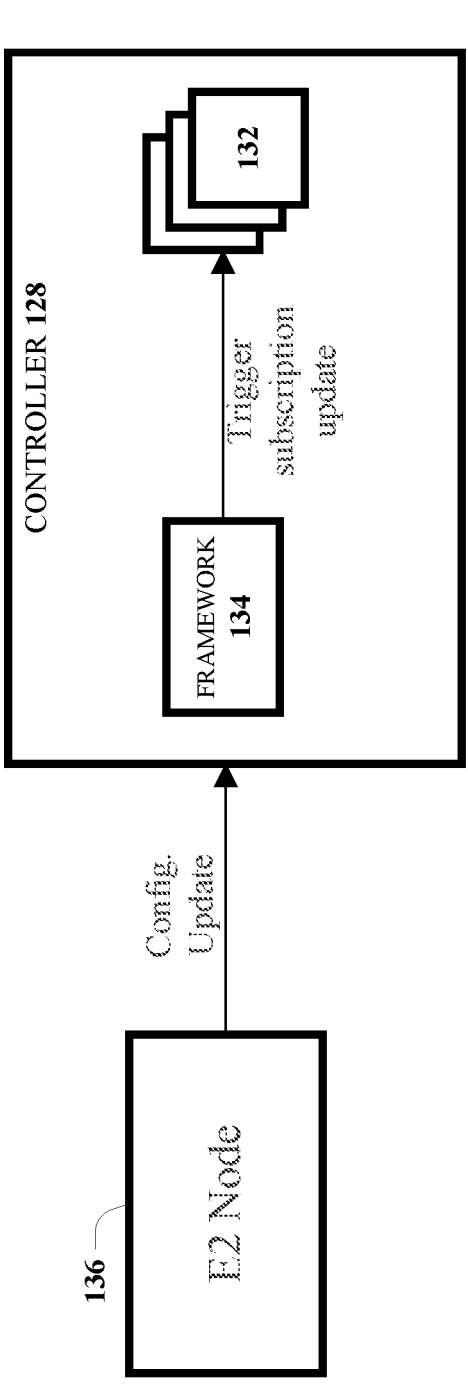
FIG. 3 is a diagram of exemplary flexible xApp subscriptions in accordance with one or more embodiments described herein.

FIG. 3 is a diagram 300 of exemplary flexible xApp 132 subscriptions in accordance with one or more embodiments described herein. It is noted that xApps 132 can support different reporting periods on requested KPIs. When a reporting period update is configured on an E2 node (e.g., RAN 136): (1) a configuration update is sent (e.g., via the communication component 116) through E2 to the near-RT RIC (e.g., controller 128), (2) the xApp framework 134 manages subscribed xApps 132 to trigger subscription changes for xApps 132 for which requested periods are no longer supported, and (3) the RAN 136 can utilize the recommended and minimum available reporting periods. A longer reporting period can impact performance of the xApp 132. However, this trade-off optimizes the subscriptions to ensure the E2 node (e.g., RAN 136) can continue supporting the subscriptions of a plurality of xApps 132.

Figure 4:
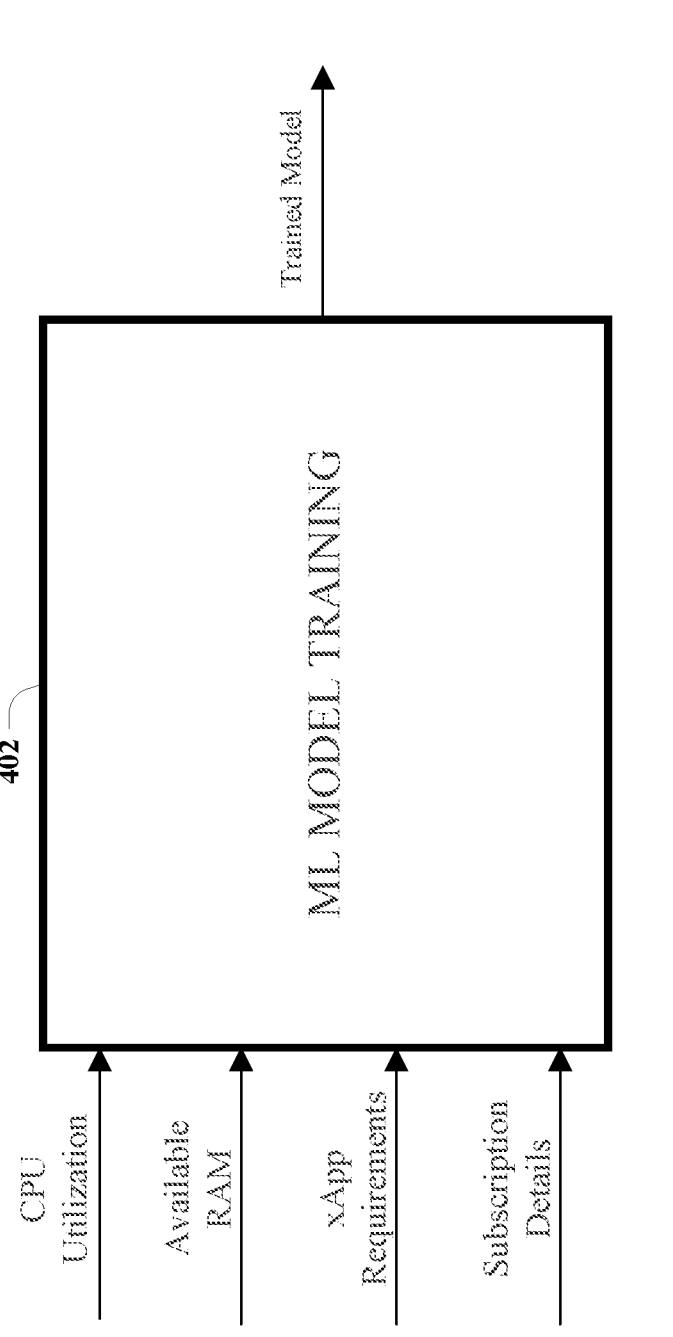
FIG. 4 is a diagram of exemplary model training in accordance with one or more embodiments described herein.

FIG. 4 is a diagram 400 of exemplary ML model training 402 (e.g., of an ML model 204) in accordance with one or more embodiments described herein. The ML model 204 can be trained, for instance, by utilizing data collected from the E2 nodes (e.g., RAN 136) and the subscribing xApps 132. In this regard, the ML model 204 can be trained using (1) CPU Utilization on E2 nodes (e.g., RAN 136), (2)

available RAM on E2 nodes (e.g., RAN 136), (3) xApp 132 requirements (e.g., requested reporting periods), and/or (4) historical subscription data (e.g., accepted and/or revised subscription requests). In various embodiments, the ML model training 402 can take place on a non-RT RIC 126 (e.g., in a corresponding, dedicated rApp). It is noted that the foregoing can utilize data collected by the host SMO 124. Alternatively, the ML model training 402 can be performed offline, for instance, using data collected from multiple networks, and then deployed onto an rApp for prediction.

Figure 5:
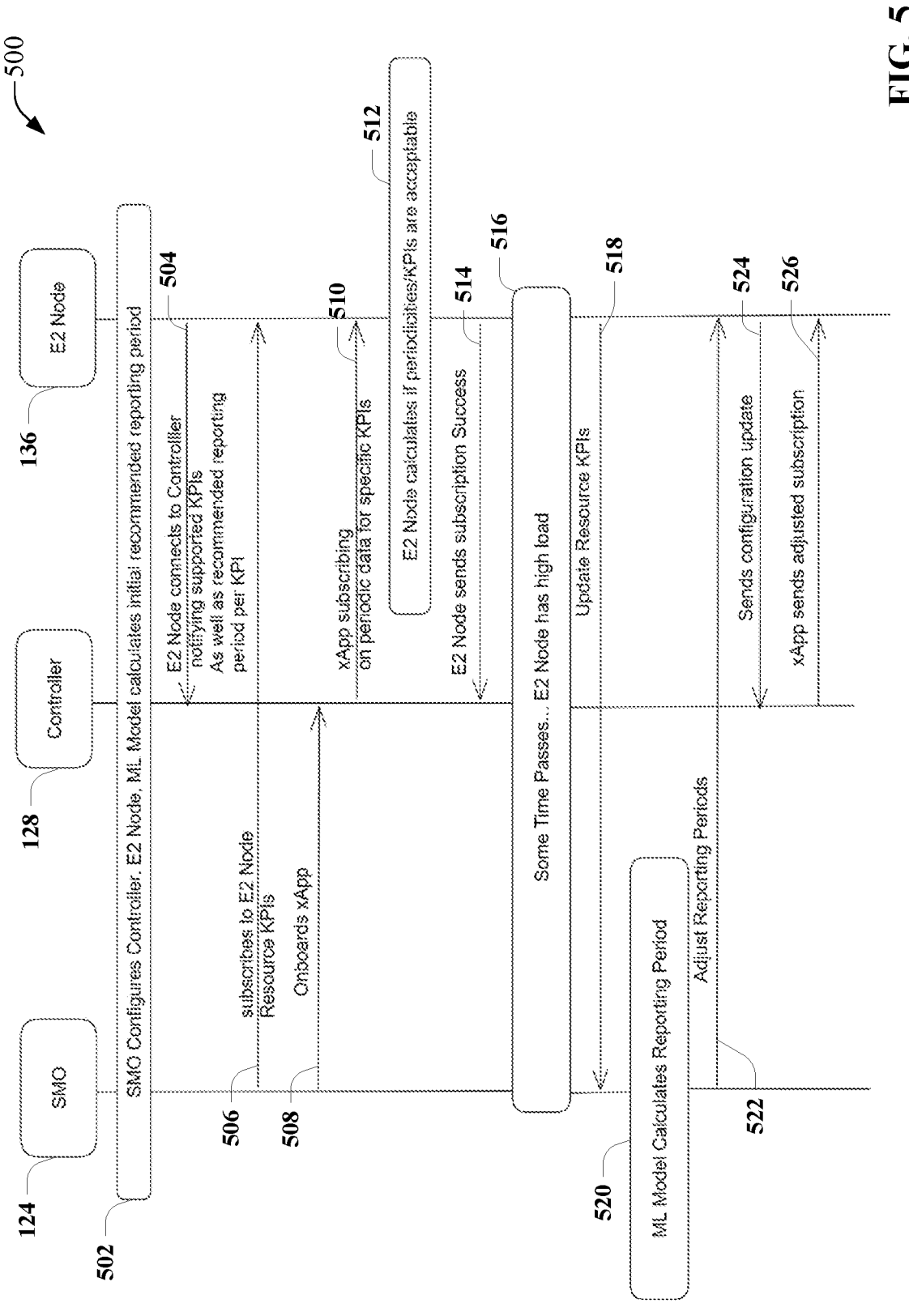
FIG. 5 is a diagram of an exemplary process flow in accordance with one or more embodiments described herein.

FIG. 5 is a diagram of an exemplary process flow 500 in accordance with one or more embodiments described herein. At 502, the SMO 124 can configure the controller 128 and/or E2 Node (e.g., RAN 136). This can comprise setting (e.g., via the SMO 124) initial recommended reporting periods for the E2 Node KPIs, as well as onboarding xApps 132 on the controller 128. At 504, the E2 Node (e.g., RAN 136) can register with the controller 128, identifying all the KPIs that the controller 128 can subscribe on and the recommended and minimum reporting periods of each, and connect to the controller 128. The xApps 132 deployed on the controller 128 can determine the recommended reporting periods and adjust accordingly, for instance, before subscribing on the KPIs. At 506, the SMO 124 can subscribe to E2 node (e.g., RAN 136) resource KPIs, which can track one or more elements such as CPU and/or RAM usage applicable to the RAN 136. At 508, the SMO 124 can onboard one or more xApps 132. At 510, one or more xApps can subscribe on periodic data for specific KPIs. At 512, the RAN 136 can determine if periodicities and/or KPIs are acceptable. In this regard, the RAN 136 can determine whether the periodicities fall within a defined acceptable range. At 514, the RAN 136 can send a subscription success message to the controller 128 (e.g., if within the defined acceptable range), and KPI data can begin to flow periodically. At 516, if the load on the E2 Node (e.g., RAN 136) were to drastically fluctuate, the ML model 204 in the SMO 124 can adjust the recommended and/or minimum reporting periods of the KPIs in the E2 Node (e.g., RAN 136). For example, corresponding network traffic can spike during a rush hour traffic. At 518, updated resource KPIs can be sent from the RAN 136 to the SMO 124. At 520, the recommendation component 114 (e.g., via the ML model 204) can calculate a reporting period applicable to the xApp 132. At 522, the SMO 124 can send the adjusted reporting periods to the RAN 136. At 524, the RAN 136 can send the configuration update to the controller 128, for instance, to adjust respective subscriptions accordingly. At 526, the controller 128 and/or an xApp 132 can send the adjusted subscription to the RAN 136.

Figure 6:
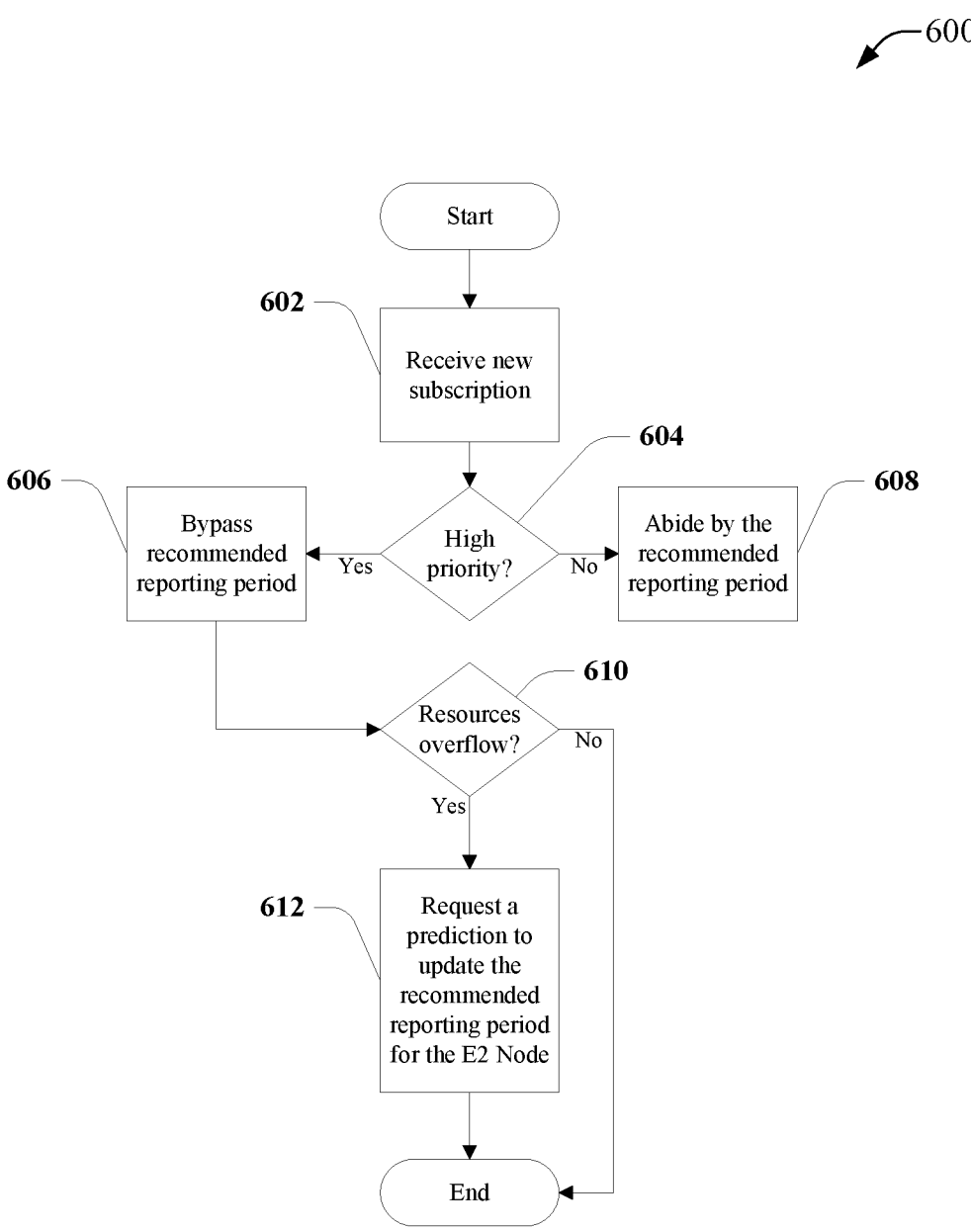
FIG. 6 is a flow chart for a process associated with dynamic node key performance indicator reporting in an open radio access network, in accordance with one or more embodiments described herein.

FIG. 6 is a flow chart for a process 600 associated with dynamic node key performance indicator reporting in an ORAN, in accordance with one or more embodiments described herein. It is noted that the xApp 132 priority ID/level can be assigned (e.g., via a system 102) during xApp 132 onboarding in the SMO 124. In this regard, some xApps can require strict reporting periods, for instance, to maintain critical functionalities. At 602, a new xApp 132 subscription request is received by the RAN 136 (e.g., via the communication component 116). The xApp 132 can send an E2 message with the subscription request and/or the xApp priority ID/level. At 604, the priority ID/level can be determined (e.g., via the priority component 118). In various embodiments, such a priority ID/level can be comprised in configuration data applicable to a corresponding xApp 132. If at 604, the priority level/ID is determined (e.g., via the priority component 118) not to comprise a defined high priority (e.g., NO at 604), the configured recommendations at the E2 node (e.g., RAN 136) can be utilized to support the subscription request (e.g., at 608). If at 604, the priority level/ID is determined (e.g., via the priority component 118) to comprise a defined high priority (e.g., YES at 604), then the E2 node (e.g., RAN 136) can accept the subscription request regardless, and the recommended reporting period can be bypassed (e.g., at 606) (e.g., via the bypass component 120). At 610, resource overflow (e.g., network degradation such as packet drop, overheating of system, near maximum utilization of CPU and/or RAM, etc.) can be determined (e.g., via the resource component 110). It is noted that such degradation can lead to degradation across an entire corresponding network. If the E2 node (e.g., RAN 136) can support the new xApp 132 without any degradation in the xApps (e.g., NO at 610), then there does not exist a need to update the reporting period to accommodate additional allocated resources for the priority xApp. If the E2 node (e.g., RAN 136) cannot support the new xApp without any degradation in the xApps (e.g., YES at 610), an update is triggered at 612 to update (e.g., via the recommendation component 114) the frequency of the reporting period of an xApp (e.g., with lower priority). The updated (e.g., lower priority) xApp will follow another suitable approach, if needed.

FIG. 7 is a block flow diagram for a process 700 associated with dynamic node key performance indicator reporting in an ORAN, in accordance with one or more embodiments described herein. At 702, the process 700 can comprise determining (e.g., via the resource component 110) resource utilization of a network node (e.g., RAN 136). At 704, the process 700 can comprise determining (e.g., via the request determination component 112) a requested reporting period of a key performance indicator, applicable to the network node (e.g., RAN 136), requested by an xApp 132 of a radio access network intelligent controller 128. At 706, the process 700 can comprise, using a reporting model (e.g., ML model 204) generated using machine learning based on past resource utilization, other than the resource utilization, and past reporting periods, other than the requested reporting period, generating (e.g., via the recommendation component 114) a reporting period recommendation applicable to the network node (e.g., RAN 136) and the extended application (xApp 132)

FIG. 8 is a block flow diagram for a process 800 associated with dynamic node key performance indicator reporting in an ORAN, in accordance with one or more embodiments described herein. At 802, the process 800 can comprise determining (e.g., via the resource component 110) resource utilization of an E2 network node (e.g., RAN 136). At 804, the process 800 can comprise determining (e.g., via the request determination component 112) a requested reporting period of a key performance indicator, applicable to the E2 network node (e.g., RAN 136), requested by an extended application (e.g., xApp 132) of a radio access network intelligent controller 128. At 806, the process 800 can comprise, using a reporting model (e.g., ML model 204) generated using machine learning based on past resource utilization, other than the resource utilization, and past reporting periods, other than the requested reporting period, determining (e.g., via the recommendation component 114) a recommended reporting period applicable to the E2 network node (e.g., RAN 136) and the extended application (e.g., xApp 132).

FIG. 9 is a block flow diagram for a process 900 associated with dynamic node key performance indicator reporting in an ORAN, in accordance with one or more embodiments described herein. At 902, the process 900 can comprise determining, by a radio access network intelligent controller comprising a processor (e.g., via the resource component 110), resource utilization of a network node (e.g., RAN 136). At 904, the process 900 can comprise determining, by the radio access network intelligent controller (e.g., via the request determination component 112), a requested reporting period of a key performance indicator, applicable to the network node (e.g., RAN 136), requested by extended application (e.g., xApp 132) associated with the radio access network intelligent controller 128. At 906, the process 900 can comprise, using a reporting machine learning model (e.g., ML model 204) generated using artificial intelligence based on past resource utilization, other than the resource utilization, and past reporting periods, other than the requested reporting period, generating, by the radio access network intelligent controller (e.g., via the recommendation component 114), recommendation data representative of a reporting period recommendation applicable to the network node (e.g., RAN 136) and the extended application (e.g., xApp 132).

Figure 10:
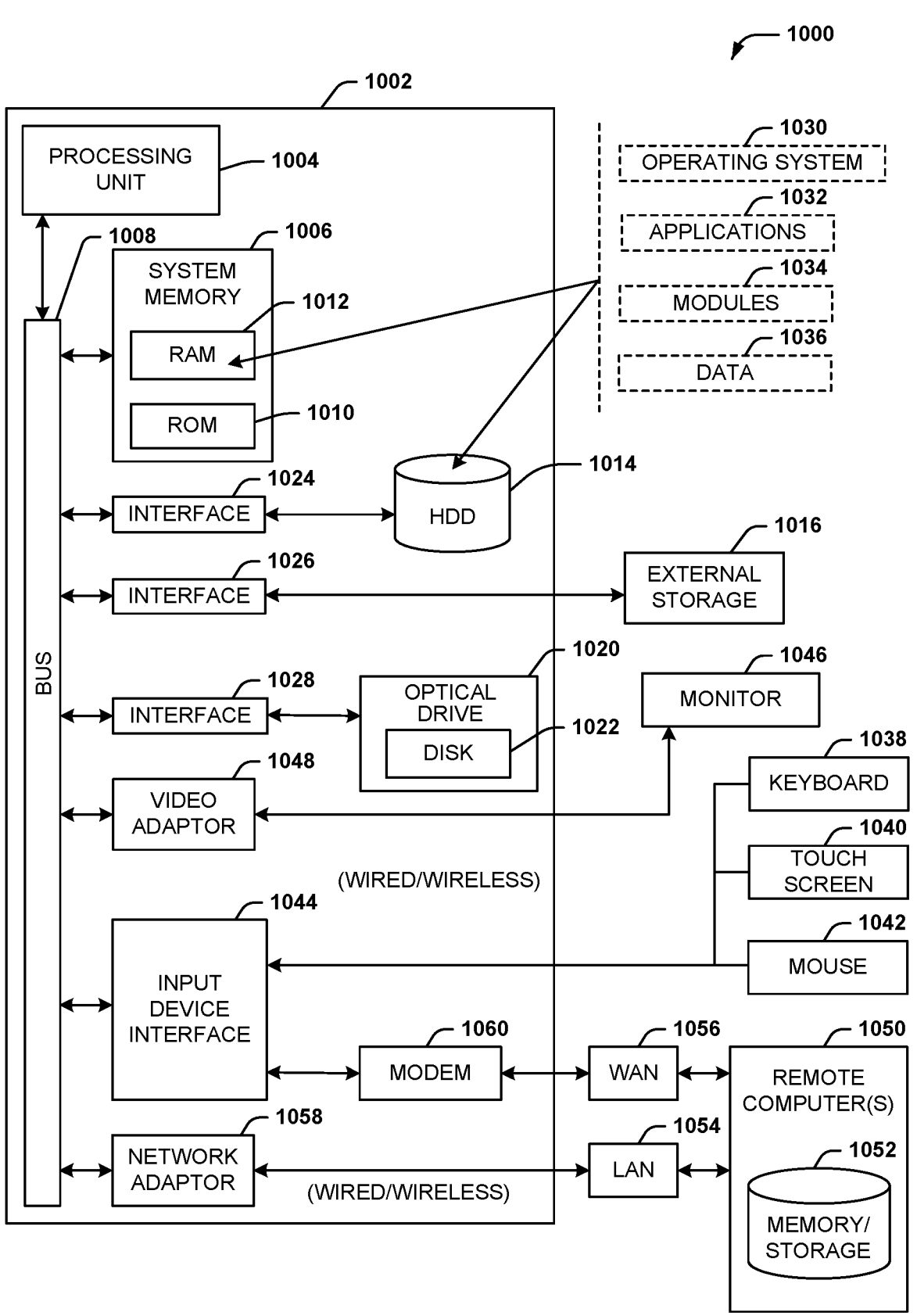
FIG. 10 is an example, non-limiting computing environment in which one or more embodiments described herein can be implemented.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory, or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries, or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared, and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a disk 1022 such as CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid-state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are examples and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 11:
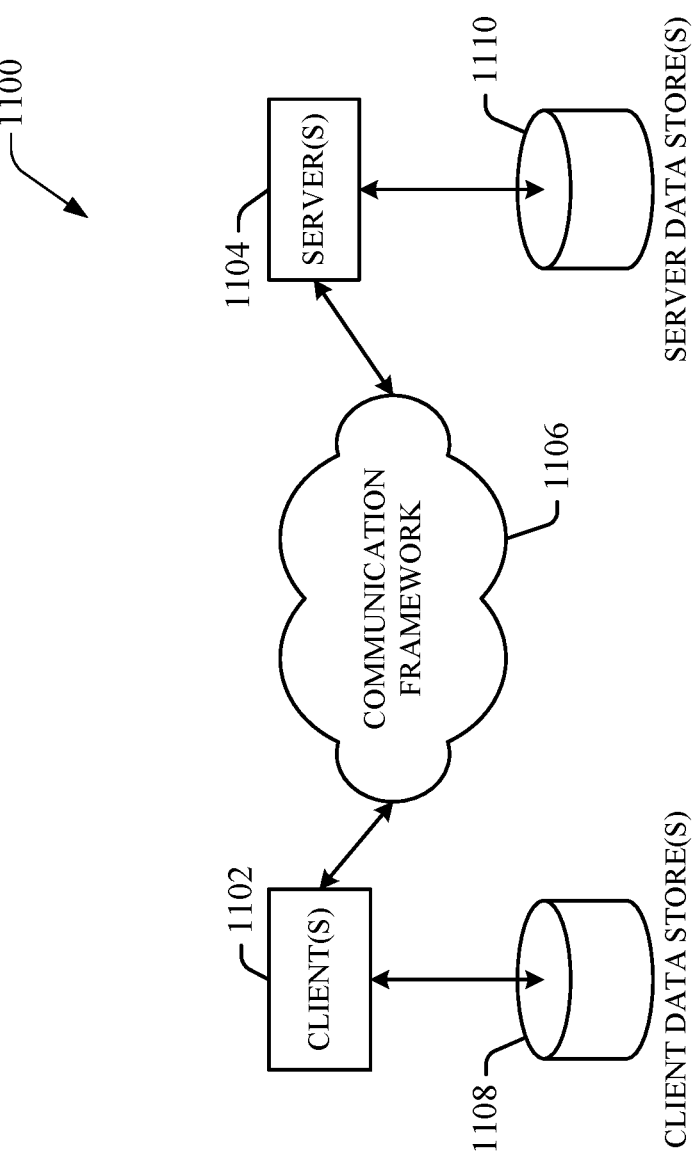
FIG. 11 is an example, non-limiting networking environment in which one or more embodiments described herein can be implemented.

Referring now to FIG. 11, there is illustrated a schematic block diagram of a computing environment 1100 in accordance with this specification. The system 1100 includes one or more client(s) 1102, (e.g., computers, smart phones, tablets, cameras, PDA's). The client(s) 1102 can be hardware and/or software (e.g., threads, processes, computing devices). The client(s) 1102 can house cookie(s) and/or associated contextual information by employing the specification, for example.

The system 1100 also includes one or more server(s) 1104. The server(s) 1104 can also be hardware or hardware in combination with software (e.g., threads, processes, computing devices). The servers 1104 can house threads to perform transformations of media items by employing aspects of this disclosure, for example. One possible communication between a client 1102 and a server 1104 can be in the form of a data packet adapted to be transmitted between two or more computer processes wherein data packets may include coded analyzed headspaces and/or input. The data packet can include a cookie and/or associated contextual information, for example. The system 1100 includes a communication framework 1106 (e.g., a global communication network such as the Internet) that can be employed to facilitate communications between the client(s) 1102 and the server(s) 1104.

Communications can be facilitated via a wired (including optical fiber) and/or wireless technology. The client(s) 1102 are operatively connected to one or more client data store(s) 1108 that can be employed to store information local to the client(s) 1102 (e.g., cookie(s) and/or associated contextual information). Similarly, the server(s) 1104 are operatively connected to one or more server data store(s) 1110 that can be employed to store information local to the servers 1104.

In one exemplary embodiment, a client 1102 can transfer an encoded file, (e.g., encoded media item), to server 1104. Server 1104 can store the file, decode the file, or transmit the file to another client 1102. It is noted that a client 1102 can also transfer an uncompressed file to a server 1104 and server 1104 can compress the file and/or transform the file in accordance with this disclosure. Likewise, server 1104 can encode information and transmit the information via communication framework 1106 to one or more clients 1102.

The illustrated aspects of the disclosure may also be practiced in distributed computing environments where certain tasks are performed by remote processing devices that are linked through a communications network. In a distributed computing environment, program modules can be located in both local and remote memory storage devices.

The above description includes non-limiting examples of the various embodiments. It is, of course, not possible to describe every conceivable combination of components or methods for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:

at least one processor; and at least one memory that stores executable instructions that, when executed by the at least one processor, facilitate performance of operations, comprising:

determining resource utilization of a network node;

determining a requested reporting period of a key performance indicator, applicable to the network node, requested by an extended application of a radio access network intelligent controller; and using a reporting model generated using machine learning based on past resource utilization, other than the resource utilization, and past reporting periods, other than the requested reporting period, generating a reporting period recommendation applicable to the network node and the extended application, wherein the past resource utilization comprises at least one of past central processing unit utilization of the network node or past available random access memory on the network node, and wherein the past resource utilization further comprises past heating levels of the network node.

2. The system of claim 1, wherein the reporting period recommendation comprises a recommended reporting period and a minimum reporting period.

3. The system of claim 1, wherein the network node comprises an E2 node.

4. The system of claim 1, wherein the operations further comprise:

receiving a subscription request from the extended application, wherein the reporting period recommendation is generated in response to receiving the subscription request.

5. The system of claim 4, wherein the operations further comprise:

determining a priority level, according to a defined priority criterion, applicable to the subscription request, wherein the reporting period recommendation is further generated based on the priority level applicable to the subscription request.

6. The system of claim 5, wherein the operations further comprise:

in response to a determination that the subscription request comprises a threshold high priority level, according to the defined priority criterion, bypassing the reporting period recommendation.

7. The system of claim 1, wherein the extended application is among a group of extended applications subscribed on the network node.

8. The system of claim 1, wherein the reporting period recommendation is determined to maintain a threshold level of network performance, applicable to the network node, according to a defined network performance criterion.

9. The system of claim 1, wherein the key performance indicator comprises a signal to interference and noise ratio applicable to the network node, or a block error rate applicable to the network node.

10. The system of claim 1, wherein the extended application comprises a network optimization extended application.

11. The system of claim 1, wherein the reporting period recommendation comprises a reporting frequency applicable to the extended application.

12. A non-transitory machine-readable medium, comprising executable instructions that, when executed by at least one processor, facilitate performance of operations, comprising:

determining resource utilization of an E2 network node;

determining a requested reporting period of a key performance indicator, applicable to the E2 network node, requested by an extended application of a radio access network intelligent controller; and using a reporting model generated using machine learning based on past resource utilization, other than the resource utilization, and past reporting periods, other than the requested reporting period, determining a recommended reporting period applicable to the E2 network node and the extended application, wherein the past resource utilization comprises at least one of past central processing unit utilization of the E2 network node or past available random access memory on the E2 network node, and wherein the past resource utilization further comprises past heating levels of the E2 network node.

13. The non-transitory machine-readable medium of claim 12, wherein the recommended reporting period comprises a minimum reporting period.

14. The non-transitory machine-readable medium of claim 12, wherein the operations further comprise:

receiving a subscription request from the extended application, wherein the recommended reporting period is generated in response to receiving the subscription request.

15. The non-transitory machine-readable medium of claim 14, wherein the operations further comprise:

determining a priority level, according to a defined priority criterion, applicable to the subscription request, wherein the recommended reporting period is further generated based on the priority level applicable to the subscription request.

16. The non-transitory machine-readable medium of claim 15, wherein the operations further comprise:

in response to a determination that the subscription request comprises a high priority level, according to the defined priority criterion, bypassing the recommended reporting period.

17. A method, comprising:

determining, by a radio access network intelligent controller comprising at least one processor, resource utilization of a network node;

determining, by the radio access network intelligent controller, a requested reporting period of a key performance indicator, applicable to the network node, requested by extended application associated with the radio access network intelligent controller; and using a reporting machine learning model generated using artificial intelligence based on past resource utilization, other than the resource utilization, and past reporting periods, other than the requested reporting period, generating, by the radio access network intelligent controller, recommendation data representative of a reporting period recommendation applicable to the network node and the extended application, wherein the past resource utilization comprises at least one of past central processing unit utilization of the network node or past available random access memory on the network node, and wherein the past resource utilization further comprises past heating levels of the network node, and wherein the recommendation data is determined to optimize an energy efficiency of the network node.

18. The method of claim 17, wherein the reporting period recommendation is determined to maintain a threshold level of network performance, applicable to the network node, according to a defined network performance criterion.

19. The method of claim 17, wherein the key performance indicator comprises ratio data representative of a signal to interference and noise ratio applicable to the network node, or block error rate data representative of a block error rate applicable to the network node.

20. The method of claim 17, wherein the recommendation data comprises reporting frequency data representative of a reporting frequency applicable to the extended application.

\* \* \* \* \*